United States Patent [19]

Nagle

[11] 4,262,064
[45] Apr. 14, 1981

[54] TOROIDAL CELL AND BATTERY

[75] Inventor: William J. Nagle, Sheffield Lake, Ohio

[73] Assignee: The United States of America as represented by the Administrator of the National Aeronautics and Space Administration, Washington, D.C.

[21] Appl. No.: 134,855

[22] Filed: Mar. 28, 1980

[51] Int. Cl.³ .............................................. H01M 6/10
[52] U.S. Cl. .................................... 429/94; 429/120; 429/160; 429/164
[58] Field of Search .................. 429/94, 120, 156–160, 429/163, 164; 29/623.1

[56] References Cited

U.S. PATENT DOCUMENTS

| | | | |
|---|---|---|---|
| 3,156,585 | 11/1964 | Yamano et al. | 429/94 |
| 3,364,069 | 1/1968 | Deschamps | 429/94 X |
| 3,377,201 | 4/1968 | Wagner et al. | 429/94 X |
| 3,490,949 | 1/1970 | Deschamps | 429/94 |
| 3,490,951 | 1/1970 | George | 429/94 X |
| 3,615,867 | 10/1971 | Cich | 29/623.1 |
| 3,734,778 | 5/1973 | Huf et al. | 429/94 X |
| 4,087,595 | 5/1978 | Mallery | 429/153 |

Primary Examiner—Anthony Skapars
Attorney, Agent, or Firm—Norman T. Musial; John R. Manning; James A. Mackin

[57] ABSTRACT

The present invention is drawn to a toroidal cell which includes a wound core disposed within a pair of toroidal channel shaped electrodes spaced apart by nylon insulator. The shape of the case electrodes of this toroidal cell allows a first planar doughnut shaped surface and the inner cylindrical case wall to be used as a first electrode and a second planar doughnut shaped surface and the outer cylindrical case wall to be used as a second electrode. Connectors may be used to stack two or more toroidal cells together by connecting substantially the entire surface area of the first electrode of a first cell to substantially the entire surface area of the second electrode of a second cell. The central cavity of each toroidal cell may be used as a conduit for pumping a fluid through the toroidal cell to thereby cool the cell.

10 Claims, 4 Drawing Figures

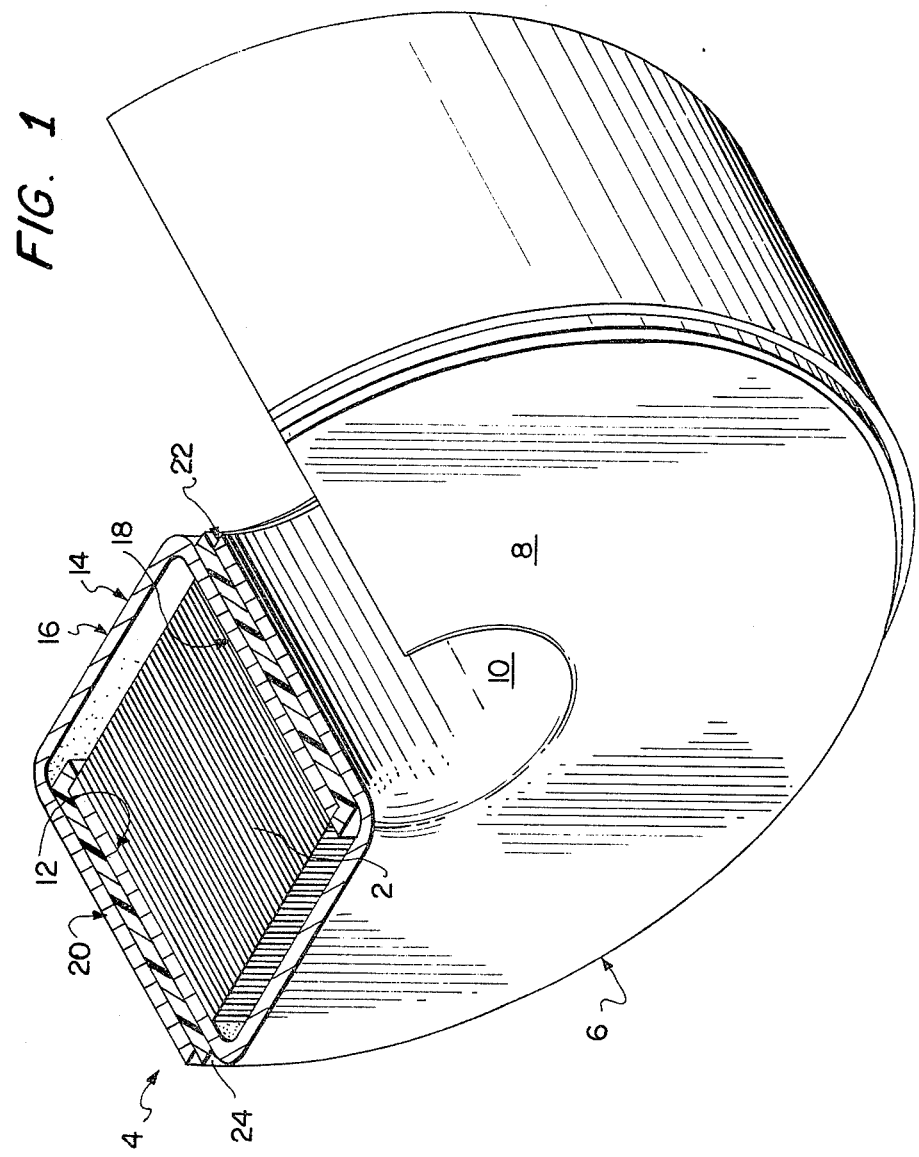

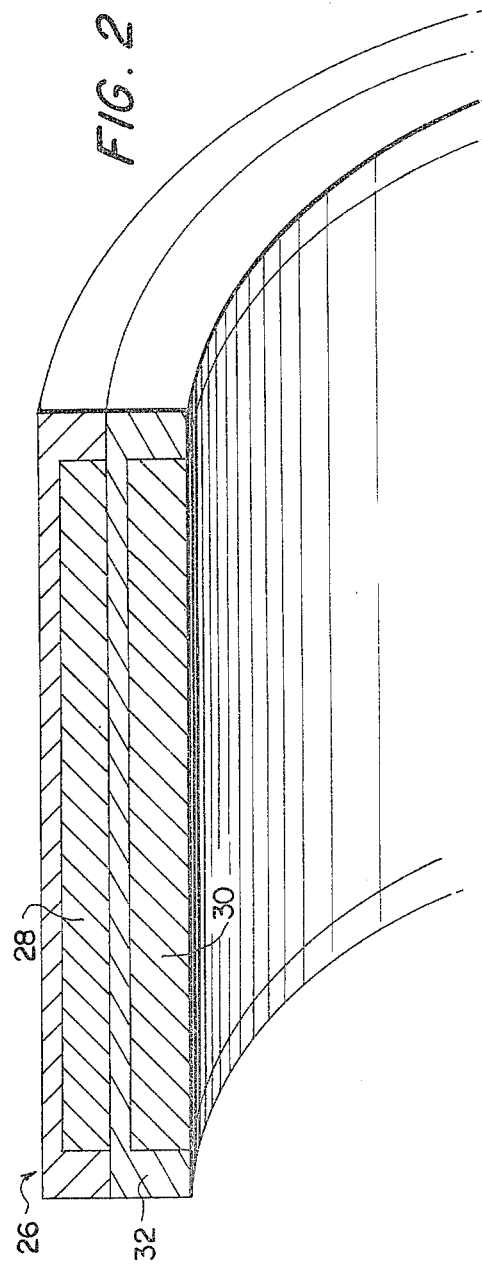
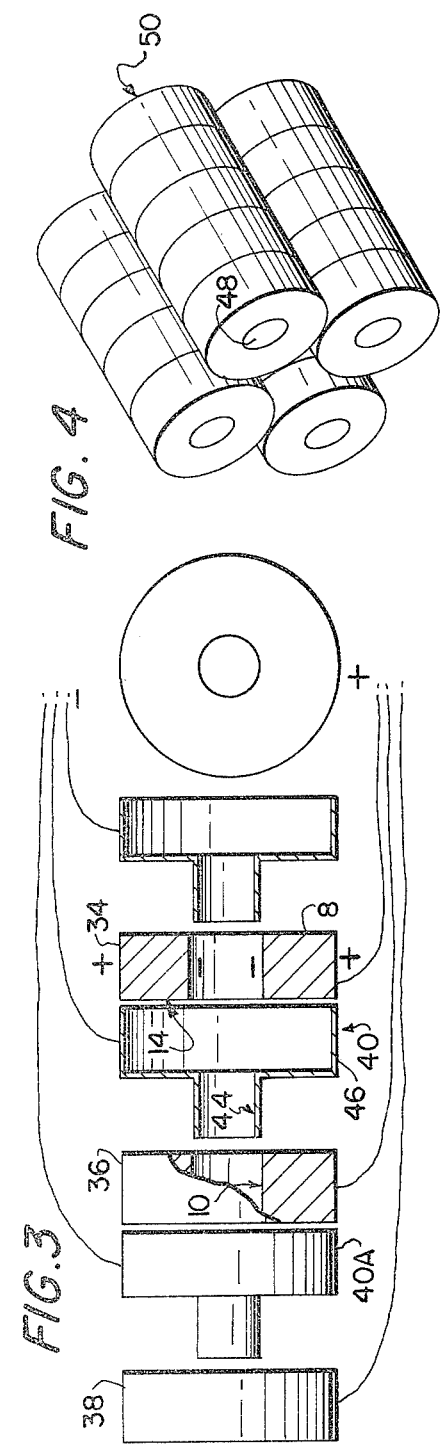

TOROIDAL CELL AND BATTERY

BACKGROUND OF THE INVENTION

Government Rights

The invention described herein was made by an employee of the U.S. Government, and may be manufactured or used by or for the Government for governmental purposes without payment of any royalties thereon or therefor.

FIELD OF INVENTION

The present invention is directed to a storage battery which is designed to handle relatively high amp-hour loads.

DESCRIPTION OF THE PRIOR ART

Heretofore batteries have been manufactured in various sizes and shapes. One standard type of battery is manufactured in the shape of a cylinder. In this cylindrical type of battery, the negative terminal is formed on one circular end while the positive terminal is formed on the other circular end. This type of battery case is completely adequate for batteries used at low power applications. However, the use of a cylindrical type battery in a relatively high power application results in a number of problems.

The small contact area present on the circular ends of such a cylindrical battery does not adequately dissipate heat generated by battery contact resistance. Also, large cylindrical type cells are difficult to adequately cool.

U.S. Pat. No. 3,364,069 to Deschamps and U.S. Pat. No. 3,734,778 to Huf et al disclose methods for producing spirally wound electrolytic cells of this cylindrical type.

There have also been attempts in the past to stack small battery cells together in order to increase the total battery voltage. U.S. Pat. No. 4,087,595 to Ciliberti, Jr. discloses one such arrangement for stacking cells to produce a multi-cell battery. In this patent, a cylindrical plastic layer is used to maintain the individual cells in contact to produce a stacked type battery.

U.S. Pat. No. 3,615,867 to Cich et al discloses a method of assembling batteries using intercell connectors. However, the intercell connectors of the Cich et al reference must be welded to the battery itself. The welded tabs of the Cich et al patent are a source of high resistance and can also produce other interconnection related problems.

SUMMARY OF THE INVENTION

It is an object of the present invention to provide a wound core type battery which is particularly suitable for relatively high output applications.

Another object of the present invention is to provide a toroidal-shaped cell which has an extremely large electrode contact surface area thereby minimizing the intercell contact resistance.

A further object of the present invention is to simplify the construction and cost of large cells and batteries.

A still further object of the present invention is to improve the energy density of large cells and batteries.

A still further object of the present invention is to provide an efficient structure for connecting together multiple battery cells.

It is a further object of the present invention to produce a battery which may be efficiently cooled by air or gas flow.

These and other objects of the present invention are accomplished by the model structure of the toroidal cell of the present invention. The toroidal cell of the present invention includes a wound core enclosed in a case comprising two toroidal-shaped case halves. These case halves are separated by a nylon insulating layer. The case includes first and second substantially doughnut shaped planar surfaces, an inner case wall and an outer case wall. A first substantially doughnut shaped surface and the inner case wall form the negative electrode of the toroidal cell while the second substantially doughnut shaped planar surface and the outer case wall form the positive terminal of the toroidal cell. Thus, the electrode surface area of the toroidal cell of the present invention is maximized.

The toroidal cells of the present invention may be stacked through the use of connectors. These connectors connect the negative electrode of a first cell to the positive electrode of a second cell by fitting inside the inner cell wall of the first cell and outside the outer cell wall of the second cell. Thus, multiple cells may by easily stacked while maintaining the intercell resistance extremely low.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 illustrates a partial section of the toroidal cell according to the present invention;

FIG. 2 illustrates the electrode sandwich structure of the wound core of the present invention;

FIG. 3 illustrates in diagrammatic form the interconnection of multiple cells through the use of connectors; and FIG. 4 illustrates the formation of a 20 cell battery using the toroidal battery cell of the present invention.

DETAILED DESCRIPTION OF THE PREFERRED EMBODIMENT

As shown in FIG. 1, the toroidal cell of the present invention comprises a wound cell core 2 formed in the shape of a toroid and having a substantially rectangular cross-sectional area. This core is surrounded by a case (generally indicated as 4) including a first substantially doughnut shaped conductive case half 6 and a second substantially doughnut shaped conductive case half 14. The first and second substantially doughnut shaped conductive case halves exhibit a trough shaped cross-section. The first substantially doughnut shaped conductive case half 6 includes a substantially doughnut shaped planar surface portion 8, a cylindrical inner case wall portion 10 extending perpendicularly from the annular edge of the hole in the substantially doughnut shaped planar surface portion 8, and a cylindrical outer case wall portion 12 extending perpendicularly from the annular outer edge of the substantially doughnut shaped planar surface portion 8.

The second substantially doughnut shaped conductive case half 14 is formed in a manner similar to the first substantially doughnut shaped conductive case half 6. The second substantially doughnut shaped conductive case half 14 includes a substantially doughnut shaped planar surface portion 16, a cylindrical inner case wall portion 18, and a cylindrical outer case wall portion 20.

The first and second substantially doughnut shaped conductive case halves 6, 14 are positioned around the wound core 2. A cylindrical inner nylon insulator 22 is used to separate the cylindrical inner case wall portion 10 of the first substantially doughnut shaped conductive case half 6 from the cylindrical inner case wall portion 18 of the second substantially doughnut shaped conductive case half 14. A cylindrical outer nylon insulator 24 is used to separate the cylindrical outer case wall portions 12, 20 of the first and second substantially doughnut shaped conductive case halves 6, 14. Both the inner and outer nylon insulators extend across substantially the entire area of an overlap formed between the cylindrical inner and outer case wall portions 10, 12, 18, 20.

Both the first and second substantially doughnut shaped conductive case halves 6, 14 are produced, in the preferred embodiment, out of stainless steel.

The swelling of the wound core 2 resulting from the addition of an electrolyte to the toroidal cell exerts considerable pressure on the inner surface of the cylindrical outer case wall portion 12 of the first substantially doughnut shaped conductive case half 6 and the cylindrical inner case wall portion 18 of the second substantially doughnut shaped conductive case half 14. However, because of the interaction between the first and second case halves 6, 14 and because of the toroidal shape of the cell of the present invention, this pressure produced by the expanding wound core 2 is easily handled by the case 4 of the toroidal cell of the present invention.

Referring in detail to FIG. 2, a single layer 26 of the wound core 2 of FIG. 1 is shown. This single layer sandwich 26 includes a nickel electrode plate 28 and a cadium electrode plate 30 spaced apart by a separator 32.

The wound cell core 2 of the present invention is formed by winding the single layer sandwich 26 on a steel mandril (not shown) in order to produce multiple layers of the single layer sandwich 26. Thus, the wound cell core 2 of the toroidal cell of the present invention includes alternate nickel electrode plates and cadmium electrode plates 28, 30. Each nickel electrode plate 28 is separated from the cadmium electrode plate 30 through the use of a separator 32.

In the preferred embodiment, the nickel electrode is approximately 0.030 inches thick, the cadmium electrode is approximately 0.042 inches thick, and the separator is approximately 0.01 inches thick.

FIG. 3 shows interconnection of a plurality of toroidal cells 34, 36, and 38 connected in series through the use of a plurality of connectors 40, 40a, and 40b.

Connector 40 includes a substantially doughnut shaped planar connector portion 42, a male connector surface portion 44, and a female connector surface portion 46. The male connector surface portion 44 extends perpendicularly from the annular edge of the hole in the substantially doughnut shaped planar connector portion 42. The female connector surface portion 46 extends perpendicularly from the annular outer edge of the planar substantially doughnut shaped connector portion 42.

To assemble a multicell stack of the battery cells of the present invention, the female connector surface portion 46 of the connector 40 is placed over the second substantially doughnut shaped conductive case half 14 which in the preferred embodiment is the positive terminal of the toroidal cell 34. The inner surfaces of the female connector surface portion 46 and the planar substantially doughnut shaped connector portion 42 are thus in contact with substantially the entire surface area of the second substantially doughnut shaped connective case half 14 which is the positive terminal of cell 34.

The female connector surface portion 46 is then inserted in the hole formed by the cylindrical inner case wall portion 10 of cell 36. When the female connector surface portion 46 is fully inserted into the hole formed by cylindrical inner case wall portion 10, the surfaces of the male connector surface portion 44 and the planar substantially doughnut shaped connector portion 42 contacts substantially the entire surface area of the first substantially doughnut shaped conductive case half 6 which in the preferred embodiment is the negative terminal of toroidal cell 36.

In the same manner a second connector 40a may be used to connect toroidal cell 36 with toroidal cell 38. Thus, by using one less connector than the number of cells desired to be stacked, a multicell battery may be formed out of the toroidal cells in the present invention. This configuration allows substantially the entire contact surface area of each toroidal cell to be utilized in conducting current from one cell to another in a stack. The toroidal cells in the present invention thus maximize the ability of a plurality of cells to pass current without excessive intercell contact resistance and its attendant heat build up.

When a plurality of the toroidal cells in the present invention are connected in this manner, a passageway 48 is created through the center of the cylindrical inner case wall portions 10 of each toroidal cell and the center of the male connector surface portions 44 of each battery connector. This cylindrical passageway 48 may be used to pump a liquid or gaseous coolant through the center of the toroidal cells to more easily maintain their operating temperatures at the desired level.

FIG. 4 shows that a 20 cell battery formed from individual toroidal cells identical to the cell shown in FIG. 1. These cells are connected in the manner shown in FIG. 3. As can be seen in FIG. 4, the passageway 48 exists through each series connection stack 50. A battery assembly such as that shown in FIG. 4 may be readily used as a large energy storage cell for orbital space applications or as the power cell for an electrical vehicle.

With regard to the battery assemblies shown in FIGS. 3 and 4, a liquid or gaseous coolant can be directed against or over the outer surfaces of each stack of cells as well as through the central passageways 48. One or more stacks for example may be disposed in a chamber through which flows a coolant. Separate connections for inflow and outflow of coolant may be made to opposite ends of the cylindrical passageway in each stack.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An electric battery comprising:
    a case; and
    cell means disposed within said case, said cell means having a positive and a negative terminal;
    said case including;
        first and second planar surfaces, each of said planar surfaces having a hole formed therethrough;
        an inner case wall extending perpendicularly between the edges of the holes formed in said first and second planar surfaces; and
        an outer case wall extending perpendicularly between the outer edges of said planar surfaces;
        said first planar surface and said inner wall forming a first conductive electrode connected to one of said positive and negative terminals;
        said second planar surface and said outer wall forming a second conductive electrode connected to the terminal not connected to said first conductive electrode.

2. An electric battery comprising:
    a toroidal shaped case; and
    cell means having a positive and a negative terminal disposed within said case;
    said case including;
        first and second substantially doughnut shaped planar surfaces;
        a cylindrical inner case wall extending perpendicularly between the annular edge of the hole in each said planar surface; and
        a cylindrical outer case wall extending perpendicularly between the annular outer edge of each said planar surface;
        said first substantially doughnut shaped surface and said cylindrical inner case wall forming a first conductive electrode which is connected to one of said positive and negative terminals;
        said second substantially doughnut shaped surface and said cylindrical outer wall forming a second conductive electrode which is connected to the terminal not connected to said first conductive electrode.

3. An electric battery comprising:
    a toroidal shaped case; and
    cell means having a positive and a negative terminal disposed within said case;
    said toroidal shaped case including;
        a first conductive case half having a planar substantially doughnut shaped surface and a cylindrical inner case wall extending perpendicularly from the annular edge of the hole in said planar substantially doughnut shaped surface;
        a second conductive case half having a planar substantially doughnut shaped surface area and a cylindrical outer case wall extending perpendicularly from the annular outer edge of said planar substantially doughnut shaped surface;
        said first and second conductive case halves being connected together in electrical isolation to form said toroidal shaped case, one of said first and second conductive case halves being electrically connected to said positive terminal and the other of said first and second conductive case halves being connected to said negative terminal.

4. The battery of claim 3 wherein said first conductive case half further includes a cylindrical outer case wall extending perpendicularly from said annular outer edge of said planar substantially doughnut shaped surface, said cylindrical outer case wall of said first conductive case half having a diameter smaller than that of the cylindrical outer case wall of said second case half; and
    wherein said second conductive case half electrode further includes a cylindrical inner case wall extending perpendicularly from the annular edge of the hole in said planar substantially doughnut shaped surface, said cylindrical inner case wall of said second conductive case half having a diameter larger than that of the cylindrical outer case wall of said second case half;
    said cylindrical inner and outer walls of said first and second conductive case halves being overlapped and spaced apart by an inner and outer cylindrical insulator layer.

5. The electric battery of any one of claims 1–4 wherein said cell means includes a negative plate and a positive plate; said plates being arranged in spirally wound layers which alternate said positive and negative plates.

6. An electric battery comprising:
    two or more cells, each including;
    a case; and
    cell means disposed within said case, said cell means having a positive and a negative terminal;
    said case including;
        first and second planar surfaces, each of said planar surfaces having a hole formed therethrough;
        an inner case wall extending perpendicularly between the edges of the holes formed in said first and second planar surfaces; and
        an outer case wall extending perpendicularly between the outer edges of said planar surfaces;
        said first planar surface and said inner wall forming a first conductive electrode connected to one of said positive and negative terminals;
        said second planar surface and said outer wall forming a second conductive electrode connected to the terminal not connected to said first conductive electrode; and
        at least one conductive connector adapted to fit over the second conductive electrode of a first cell, said at least one conductive connector being formed to allow the first conductive electrode of a second cell to fit over said at least one connector, said connector electrically connecting said first and second cells in series.

7. The battery of claim 6 wherein a plurality of cells may be connected in series to produce a battery of a desired voltage by using additional connectors.

8. The battery of claim 6 wherein said connector includes;
    a planar surface portion having a hole formed therethrough;
    a male connector surface portion extending perpendicularly from the entire edge of the hole in said planar surface; and
    a female connector surface portion extending perpendicularly from the outer edge of said planar surface portion;
    said female connector surface portion fitting over the second conductive electrode of said first cell to thereby contact substantially the entire surface area of said second conductive electrode of said first cell;

said male connector surface portion fitting inside the inner wall of the first conductive electrode of said second cell to thereby contact substantially the entire surface area of said first conductive electrode of said second cell.

9. The battery of claim 6 wherein a coolant may be pumped through a central cavity formed by the inner case wall of each said cell.

10. The battery of claims 1, 2, or 3 wherein a coolant may be pumped through a cavity formed by inner case wall of said battery.

* * * * *